United States Patent [19]

Kakimura

[11] Patent Number: 5,303,071
[45] Date of Patent: Apr. 12, 1994

[54] COLOR CORRECTOR IN AN APPARATUS FOR PRODUCING COLOR IMAGE

[75] Inventor: Yoshiaki Kakimura, Machida, Japan

[73] Assignee: Victor Company of Japan, Ltd., Kanagawa, Japan

[21] Appl. No.: 73,282

[22] Filed: Jun. 7, 1993

Related U.S. Application Data

[63] Continuation of Ser. No. 813,139, Dec. 23, 1991, abandoned.

[30] Foreign Application Priority Data

Dec. 25, 1990 [JP] Japan ............................. 2-413735

[51] Int. Cl.$^5$ .............................................. H04N 1/46
[52] U.S. Cl. ................................ 358/519; 358/518; 348/675
[58] Field of Search ................. 358/518, 519, 520, 30, 358/32, 34, 172, 21 R, 54, 214, 527; H04N 5/202, 9/69, 1/46

[56] References Cited

U.S. PATENT DOCUMENTS

| | | | |
|---|---|---|---|
| 4,931,864 | 6/1990 | Kawamura et al. | 358/32 |
| 5,126,831 | 6/1992 | Nakagawara | 358/21 R |
| 5,150,206 | 9/1992 | Roberts | 358/30 |

FOREIGN PATENT DOCUMENTS

22790  1/1990  Japan .

OTHER PUBLICATIONS

"A New Method for Calculating Color Reproducing Matrix Keeping the Grayness of Achromatic Colors", (1990) 7th Color Engineering Conference.

*Primary Examiner*—Edward L. Coles, Sr.
*Assistant Examiner*—Kim Yen Vu
*Attorney, Agent, or Firm*—Michael N. Meller

[57] ABSTRACT

A color corrector for correcting chromaticity of a color image to be reproduced is provided in a color printer or a CRT display device for reproducing a color image from respective signals corresponding to predetermined primary colors of a plurality of primary colors constituting the color image. This color corrector comprises: a corrective operation circuit for executing an operation between a color correction coefficient matrix and signals corresponding to the primary colors to correct relative levels of the signals corresponding to the primary colors; a gray component extraction circuit for making level comparison between the signals corresponding to the primary colors to thereby extract a gray component; a correction signal output circuit for executing an operation between the extracted gray component and correction coefficients determined by the matrix to output gray balance correction signals every primary colors; and an adding circuit for adding signals of which levels are corrected in correspondence with respective primary colors outputted from the corrective operation circuit to outputs from the correction signal output circuit.

6 Claims, 4 Drawing Sheets (a) 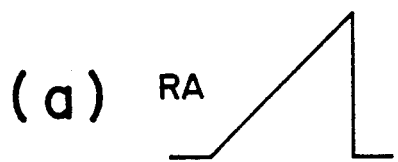
(b) 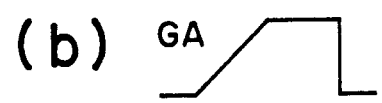
(c) 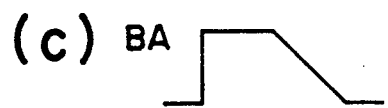
(d) 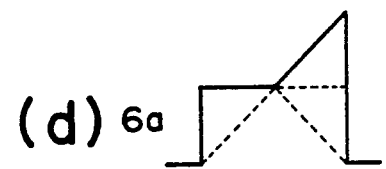
(e) 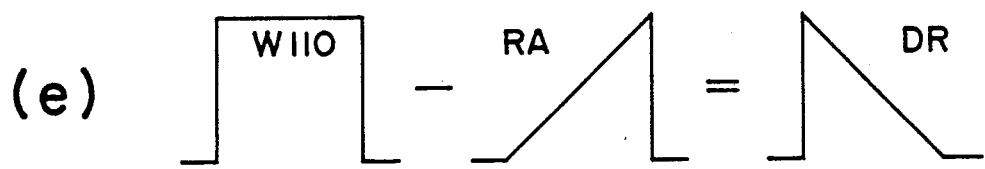
(f) 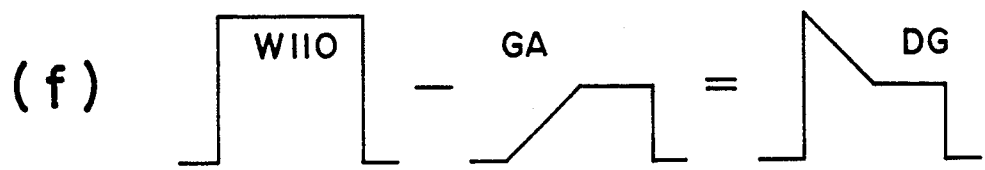
(g) 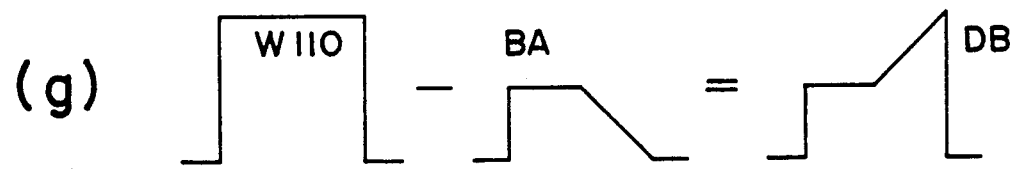
(h) 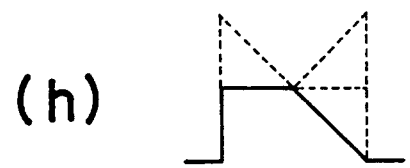
(i) 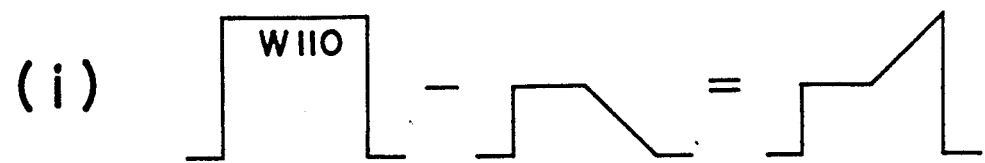
F I G. 3

COLOR CORRECTOR IN AN APPARATUS FOR PRODUCING COLOR IMAGE

This application is a continuation, of application Ser. No. 813,139, filed Dec. 23, 1991, now abandoned.

BACKGROUND OF THE INVENTION

This invention relates to a color corrector in a color image reproducing apparatus for displaying/printing a color image on the basis of color signals or color data (hereinafter referred to as video signals) corresponding to primary colors such as Red (R), Green (G) and Blue (B), etc., and more particularly to a color corrector in a color image reproducing apparatus for converting video signals of R, G and B to recording density signals or data (hereinafter referred to as recording density signals) of Cyan (C), Magenta (M) and Yellow (Y) which are complementary colors thereof, respectively.

For example, in color Televisions (TV), an approach is employed to represent a color image as sum of respective components of the three primary colors respectively having predetermined chromaticities to further convert electro-optic conversion characteristics of emitting bodies of respective primary colors on the reproducing side to electric signals to which correction (which is called a $\gamma$-correction) is implemented. Accordingly, in reproducing such electric signals, three primary colors having the same chromaticities and conversion characteristics as those used at the conversion to electric signals are used in principle.

In practice, for the reason why it is difficult to increase the brightness of a display image, there are instances where primary colors of which chromaticities deviate from the above-mentioned predetermined chromaticities are used as a light source for regenerative display. Further, in the case of providing a hard copy from the above-described electric signals by using a printer, an approach is employed to convert signals corresponding to the above three primary colors to signals corresponding to Cyan, Magenta and Yellow (the subtractive primaries) which are respectively complementary colors thereof to convert $\gamma$-corrected signals to original ones (inverse $\gamma$-correction) so that density signals corresponding to respective complementary colors are provided to carry out printing by using these density signals thus to reproduce or reconstruct an image. Also in this case, it frequently takes place that inks used have the relationship that their colors are not completely complementary to the original three primary colors (R, G, B).

In the case where the chromaticities of primary colors used at the time of reproduction or reconstruction of an image deviate from desired chromaticities as in the above-mentioned example, colors of a display image or hard copy are reconstructed or reproduced in a manner that their chromaticities also deviate from those of the original image. In order to correct such a deviation, a color corrector is used.

A conventional example of a color corrector for printer used for the above purpose is shown in FIG. 1.

This color corrector circuit 50 comprises a frame memory 51 for storing color video signals R, G and B corresponding to respective primary colors (Red, Green, Blue), an inverse $\gamma$-correction/luminance-density conversion circuit 52 for implementing an inverse $\gamma$-correction to color video signals R, G and B read out from the frame memory 51 to provide signals of R$\gamma$, G$\gamma$ and B$\gamma$, and to convert these $\gamma$-corrected color video signals R$\gamma$, G$\gamma$ and B$\gamma$ to optical density signals DR, DG and DB of Cyan, Magenta and Yellow which are respectively complementary colors thereof, and a color masking circuit 53 provided with the optical density signals DR, DG and DB to output printing or recording density signals C, M and Y.

As previously described above, since, in most cases, inks (dye stuffs) of respective colors of Cyan, Magenta and Yellow used in a printer have not desired optical characteristics as the primary colors, for example, a component of a primary color is mixed with other colors, when printing is simply carried out in accordance with the optical density signals DR, DG and DB, a hard copy having a chromaticity deviating from that of the original image may be provided.

The color masking circuit 53 carries out a signal processing based on the color masking matrix expressed as the following equation (1) in order to lessen the influence of the above-mentioned contamination color, thus to output recording density signals C, M and Y such that a reproduced color on a hard copy has a density close to the density corresponding to optical density signals DR, DG and DB.

$$\begin{pmatrix} C \\ M \\ Y \end{pmatrix} = \begin{pmatrix} A11 & A12 & A13 \\ A21 & A22 & A23 \\ A31 & A32 & A33 \end{pmatrix} \begin{pmatrix} Db \\ Dg \\ Dr \end{pmatrix} \quad (1)$$

Generally, the color correction coefficient Aij shown in FIG. (1) is set by using various least square methods. These least square methods are described in detail in, e.g., "Journal of the Society of Image Electronics" Vol. 18, No. 1, 1989, pp. 20 to 28.

However, with a method of setting the correction coefficient Aij so that each reproducibility of intermediate colors becomes good by the least square method as shown in the above example, there are instances where the gray balance of a reproduced color on a hard copy or a display image is collapsed or destroyed.

SUMMARY OF THE INVENTION

An object of this invention is to provide a novel color corrector capable of preventing collapse or loss of gray balance followed by color correction in a display or printing of a color image, thus to carry out a clear color correction free from such a collapse.

To attain the above-described object, a color corrector according to this invention comprises an element for performing a predetermined operation on the basis of a correction coefficient matrix obtained by the least square method and signals corresponding to inputted respective primary colors, an element for correcting intermediate colors reproduced by the above operation, an element for separating a gray component from signals corresponding to respective primary colors delivered to the element for correcting intermediate colors, an element for performing an operation to determine correction signals of the gray component on the basis of the separated gray component and color correction coefficients every primary colors, and an element for adding the correction signals of the gray component outputted from the last-mentioned operation element to outputs from the element for correcting intermediate colors, thus to carry out color correction free from collapse of the gray balance by the action of these elements.

In accordance with one aspect of this invention, the color corrector comprises a maximum level primary color signal selection circuit for selecting a signal of which signal level is maximum from three primary color signals of a color image inputted to a color masking circuit to output the selected signal, multiplying circuits for implementing a predetermined signal processing to an output signal from the maximum level primary color signal selection circuit on the basis of color correction coefficients in respective row directions of the color masking matrix, the multiplying circuits being correspondingly provided every respective rows of the color masking matrix, and adding circuits for adding output signals from the multiplying circuits correspondingly provided every respective rows to respective recording density signals of three colors outputted from the color masking circuit.

The maximum level primary color signal selection circuit selects a signal of the maximum level from the three primary color signals of a color image to output that signal.

Respective multiplying circuits implements a predetermined operational processing to an output signal from the maximum level primary color signal selection circuit on the basis of coefficients every rows of the color masking matrix to output the result thereof.

Respective adding circuits respectively add outputs from the respective multiplying circuits to recording density signals of respective colors serving as outputs from the color masking circuit to output gray component correction recording density signals.

By carrying out printing on the basis of these gray component correction recording density signals, it is possible to provide a recording (printing) result having an excellent reproducibility of an intermediate color without allowing the gray balance to be destroyed.

As described above, the color corrector for color printer according to this invention is of a structure to select a signal of the maximum level from respective primary color luminance signals to multiply it by a predetermined coefficients to add them to respective outputs from the color masking circuit. Thus, a print out excellent in reproducibility of an intermediate color and free from collapse of an achromatic component can be provided by a simple configuration.

BRIEF DESCRIPTION OF THE DRAWINGS

In the accompanying drawings:

FIGS. 3(a) to 3(i) are characteristic diagrams showing waveforms for explaining the principle of the operation of color correction in the color corrector according to the first embodiment shown in FIG. 2.

DETAILED DESCRIPTION OF THE PREFERRED EMBODIMENTS

Preferred embodiments of a color corrector for a color printer according to this invention will now be described in detail with reference to the attached drawings. In this invention, there are presented a first embodiment most suitable for a hard copy, etc. to carry out color correction by the subtractive mixture of colors and a second embodiment most suitable for a CRT display to carry out color correction by the additive mixture of colors. Explanation will be given in succession in connection with these embodiments.

Figure 1:
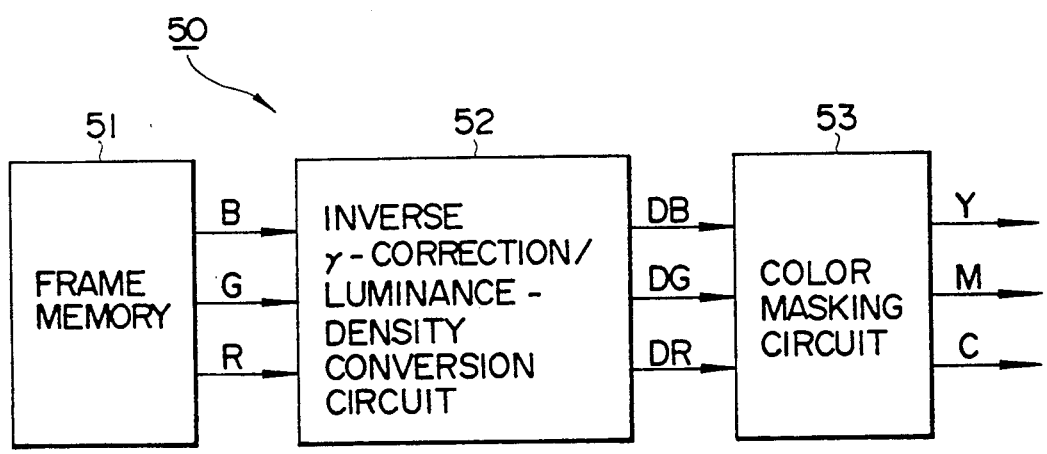
FIG. 1 is a block diagram showing the outline of the configuration of a conventional color reproducing system.
Figure 2:
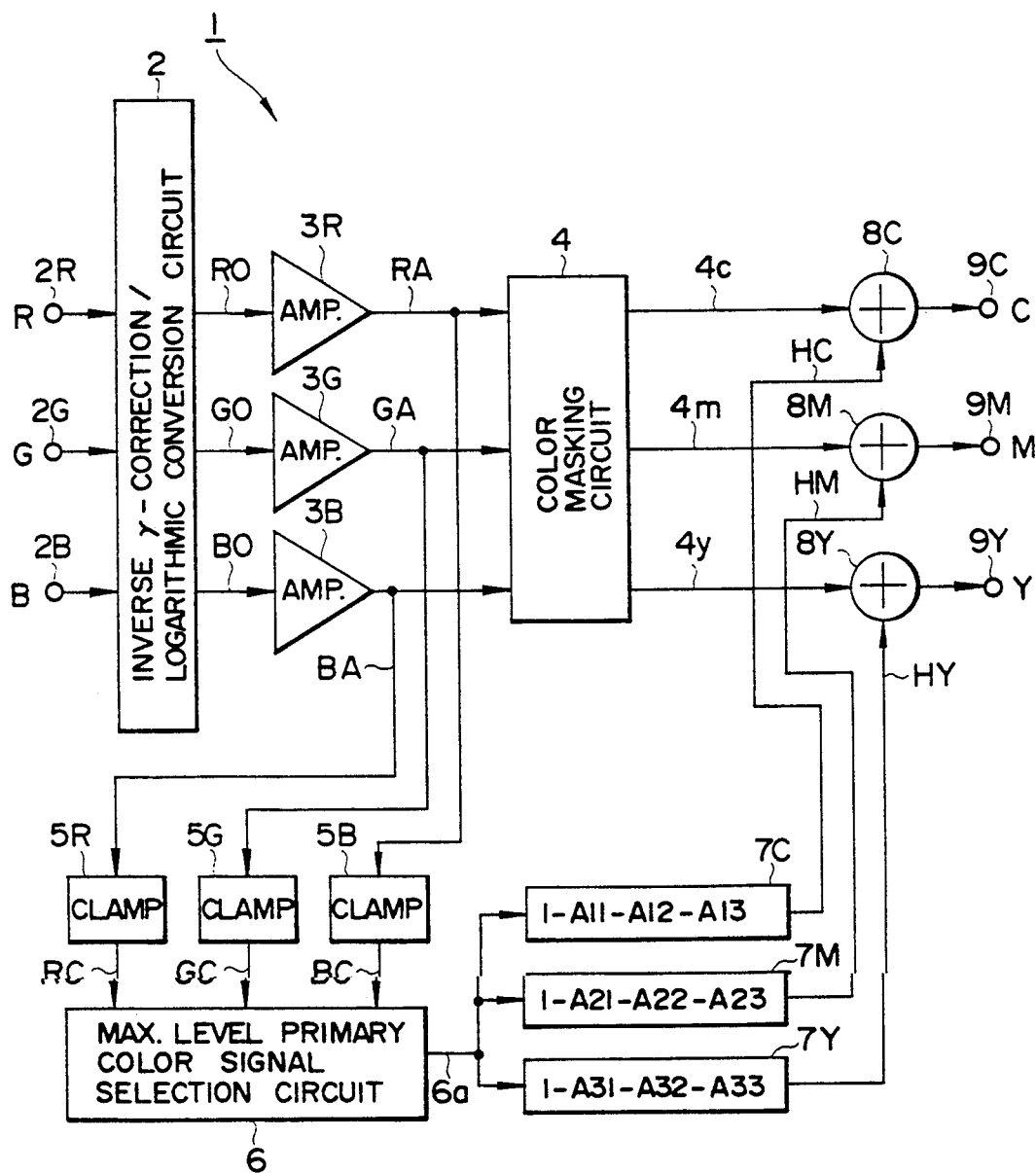
FIG. 2 is a block diagram showing the configuration of a color corrector for a color printer according to a first embodiment of this invention.

FIG. 2 is a block diagram showing the configuration of a color corrector according to the first embodiment using the subtractive mixture of colors, and FIGS. 3(a) to (i) are characteristic diagrams when color correction is carried out by using this color corrector. In the block diagram of FIG. 2, this color corrector 1 for a color printer comprises an inverse $\gamma$-correction/logarithmic conversion circuit 2 for implementing inverse $\gamma$-correction and logarithmic conversion to three primary color video signals R, G and B of a color image applied to respective input terminals 2R, 2G and 2B, wide-band amplifying circuits (AMP) 3R, 3G and 3B for amplifying output signals RO, GO and BO from the inverse $\gamma$-correction/logarithmic conversion circuit 2, a color masking circuit 4 for implementing a signal processing based on the matrix represented by the above equation (1) to output signals RA, GA and BA from the respective wide-band AMPs 3R, 3G and 3B to output the results thereof, clamping circuits 5R, 5G and 5B for allowing the pedestal levels of output signals RA, GA and BA from the respective wide-band AMPs 3R, 3G and 3B to match with each other, a maximum level primary color signal selection circuit 6 for making an operation of comparison between signal levels of output signals RC, GC and BC from the respective clamping circuits 5R, 5G and 5B, or similar operation to select a signal of the maximum level to output that signal, multiplying circuits 7C, 7M and 7M for implementing a predetermined signal processing to an output signal 6a from the maximum level primary color signal selection circuit 6 to output the results thereof, adding circuits 8C, 8M and 8Y for adding output signals HC, HM and HM from corresponding multiplying circuits 7C, 7M and 7Y to respective output signals 4c, 4m and 4y from the color masking circuit 4, and output terminals 9C, 9M and 9Y for recording signals connected to the output terminals of the respective adding circuits 8C, 8M and 8Y.

More particularly, the respective multiplying circuits 7C, 7M and 7Y are of a structure to carry out a signal processing so as to satisfy the relationship represented by the following equation (2). Practically, these circuits are comprised of one or plural operational amplifiers and the peripheral circuit parts thereof, etc.

$$\left.\begin{array}{l} HC = \text{Output signal (6a) of the maximum} \\ \text{level primary color signal selection} \\ \text{circuit} \times (1 - A11 - A12 - A13) \\ HM = \text{Output signal (6a) of the maximum} \\ \text{level primary color signal selection} \\ \text{circuit} \times (1 - A21 - A22 - A23) \\ HY = \text{Output signal (6a) of the maximum} \\ \text{level primary color signal selection} \\ \text{circuit} \times (1 - A31 - A32 - A33) \end{array}\right\} \quad (2)$$

It is to be noted that while explanation has been given in connection with an analog signal in the first embodiment, in the case where a digital image signal is dealt, these multipliers 7C, 7M and 7Y may be comprised of a digital signal processing circuit and a conversion Table constituted with ROM, etc., or a CPU and programs for the computational processing, etc.

Further, the maximum level signal selection circuit 6, the respective multipliers 7C, 7M and 7Y, and the respective adders 8C, 8M and 8Y may be comprised of a single digital signal processing circuit or a processor for digital signal processing. In addition, the color masking circuit 4 may be united in such a digital signal processing circuit or digital signal processor.

In principle, color corrective operation is performed to color signals extracted their gray components beforehand and thereafter the gray components are added to corrected color signals for maintaining the gray balance of a reproduced image from them.

In above-mentioned configuration, the color corrective operation is performed to color signals with their gray components and the gray components are extracted from the color signals corresponding to the portions where inks such as C, M and Y overlap with each other. Then compensation signals for recovering the gray balance calculated from the gray components so extracted and the coefficients of the color corrective operation, are added to the color corrected signals. These two methods provide the same result.

The principle thereof will now be described with reference to the following equations (3) to (8).

First, conversion from respective primary color video signals R, G and B to density signals DR, DG and DB is carried out. When the maximum values of the respective primary color luminance signals R, G and B are represented by RM, GM and BM, respectively, respective density signals DR, DG and DB are expressed by the following equation (3):

$$\left.\begin{array}{l} DR = RM - RA \\ DG = GM - GA \\ DB = BM - BA \end{array}\right\} \quad (3)$$

It is assumed that, for keeping the gray balance unchanged during color corrective operation, the gray component is extracted previously. When respective density signals in the case where the gray component is added thereafter are represented by DRd, DGd and DBd, respectively, these density signals are expressed by the following equation (4):

$$\left.\begin{array}{l} DRd = A11(DR - GRAY) + A12(DG - GRAY) + A13(DB - GRAY) + GRAY \\ DGd = A21(DR - GRAY) + A22(DG - GRAY) + A23(DB - GRAY) + GRAY \\ DBd = A31(DR - GRAY) + A32(DG - GRAY) + A33(DB - GRAY) + GRAY \end{array}\right\} \quad (4)$$

When substitution of the equation (3) into the equation (4) is made to carry out arrangement of the equation with respect to the density signal DRd, the density signal DRd is expressed by the following equation (5).

$$\begin{aligned} DRd &= A11DR + A12DG + A13DB + \\ &\quad (1 - A11 - A12 - A13)GRAY \\ &= A11RM + A12GM + A13BM - \\ &\quad (A11RA + A12GA + A13BA) + \\ &\quad (1 - A11 - A12 - A13) \, GRAY \end{aligned} \quad (5)$$

Conversion from the density signal DRd to a recording signal C for print is expressed by the following equation (6).

$$\begin{aligned} C &= RM - DRd \\ &= RM - (A11RM + A12GM + A12BM) + \\ &\quad A11RA + A12GA + A13BA - \\ &\quad (1 - A11 - A12 - A13) \, GRAY \end{aligned} \quad (6)$$

Here, if the maximum luminance values RM, GM and BM that the respective primary color video signals R, G and B can take satisfy the relationship represented by the following equation (7), the recording signal C is expressed by the following equation (8):

$$RM = GM = BM = W110 \quad (7)$$

where W110 indicates a value when the maximum level is assumed as 110IRE.

$$\begin{aligned} C &= A11RA + A12GA + A13BA + \\ &\quad (1 - A11 - A12 - A13)W110 - \\ &\quad (1 - A11 - A12 - A13) \, GRAY \\ &= A11RA + A12GA + A13BA + \\ &\quad (W110 - GRAY)(1 - A11 - A12 - A13) \end{aligned} \quad (8)$$

When similar calculations are carried out also in connection with Magenta and Yellow to make arrangement of the equation (8), recording signals C, M and Y are expressed by the following equation (9):

$$\left.\begin{array}{l} C = A11RA + A12GA + A13BA + (W110 - GRAY)(1 - A11 - A12 - A13) \\ M = A21RA + A22GA + A23BA + (W110 - GRAY)(1 - A21 - A22 - A23) \\ Y = A31RA + A32GA + A33BA + (W110 - GRAY)(1 - A31 - A32 - A33) \end{array}\right\} \quad (9)$$

The first term of this equation (A11RA+A12GA+A13BA) is realized in the color masking circuit 4.

The term (W110 −GRAY) in the above equation (9) will now be described with reference to FIG. 3.

FIG. 3(a) to (c) show waveforms of respective primary color video signals RA, GA and BA wherein the abscissa and the ordinate represent time and the signal level, respectively. According as the signal level becomes high, the luminance becomes high.

FIG. 3(d) is a signal waveform in which only the maximum level of each of the primary color video signals RA, GA and BA shown in FIGS. 3(a) to (c) is selected and represented by the solid line. This corresponds to an output signal 6a from the maximum level primary color selection circuit 6.

FIGS. 3(e) to (g) show respective density signals DR, DG and DB (the right side in the figure) obtained by subtracting signals corresponding to primary color video signals RA, GA and BA of FIG. 2 (the center in the figure) from signals (the left side in the figure) showing the maximum luminance level W110.

FIG. 3(h) shows by the solid line the minimum level of each of the density signals DR, DG and DB shown in FIGS. 3(e) to (g). The solid line corresponds to the gray component.

FIG. 3(i) shows a difference between the signal indicating the maximum luminance level W110 and the gray component, and the waveform on the right side of this figure is the same as that shown in FIG. 3(d).

As stated above, differences between signals obtained by extracting, as the gray component, the minimum levels of density signals DR, DG and DB converted from the primary color video signals R, G and B and a signal indicating the maximum luminance level W110 are provided by selecting the maximum levels of the respective three primary color video signals R, G and B. Thus, the second term of the equation (9) [(W110−GRAY)(1A11−A12−A13)]is realized in the multiplying circuit 7C.

It is to be noted while it has been described that the color corrector of the first embodiment is constructed to carry out a color correction by the subtractive mixture of colors in order to apply this color corrector to a color printer, etc., this invention is not limited to such an embodiment. For example, in the case where this invention is applied to a CRT display device, etc., also by employing a second embodiment where color correction by the additive mixture of colors which will be described below is carried out, effects and/or advantages similar to the above are provided.

Figure 4:
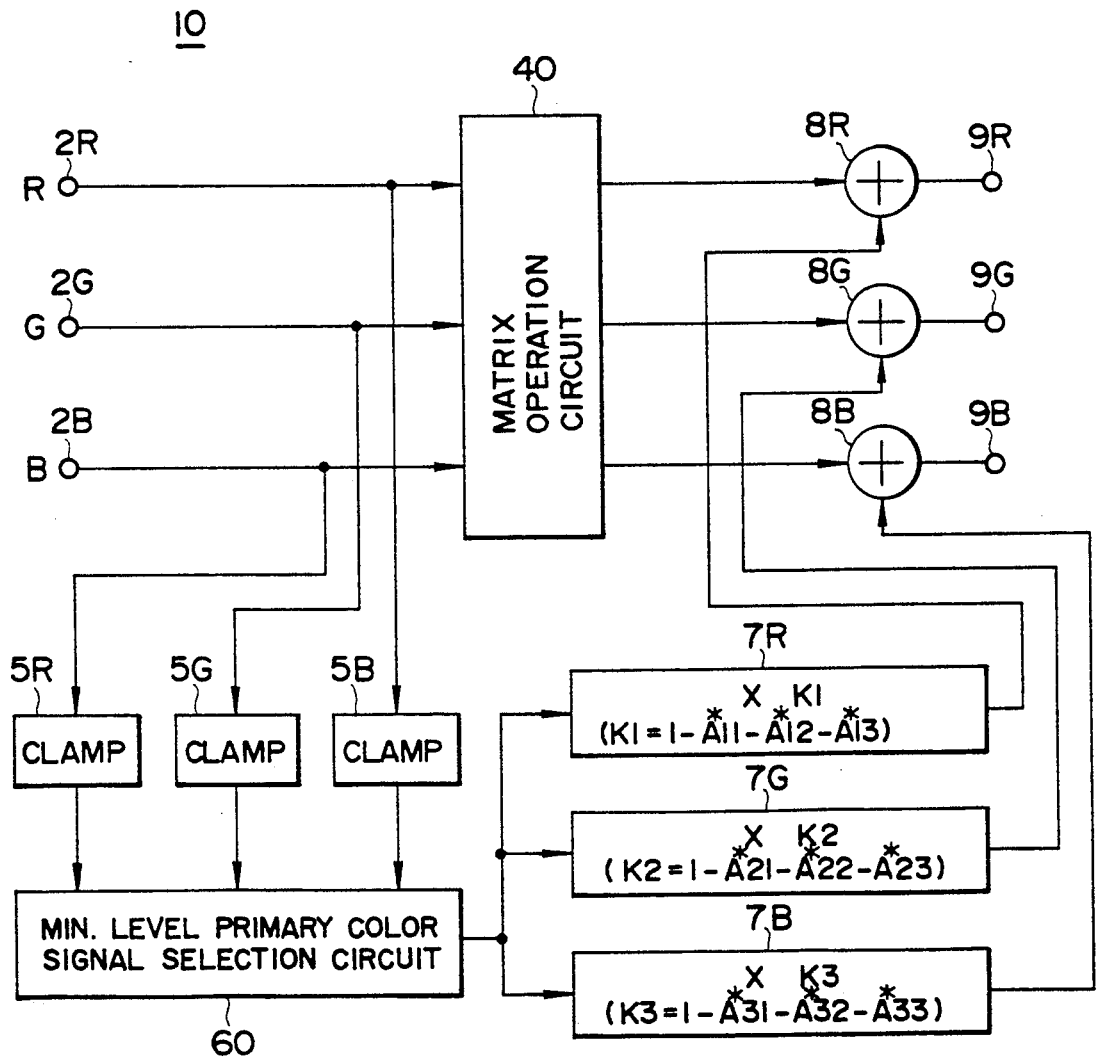
FIG. 4 is a block diagram showing the configuration of a color corrector for a color printer according to a second embodiment of this invention.

FIG. 4 is a block diagram showing a color corrector according to the second embodiment of this invention. In this second embodiment, the same technique as that of the first embodiment is applied to color correction in a regenerative display of a device such as CRT, etc.

In the case of CRT display, since a color image is reproduced by the additive mixture of colors, the conversion to complementary colors and the inverse γ-correction required in providing a hard copy to reproduce a color image by the subtractive mixture of colors become unnecessary. Accordingly, color video signals corresponding to respective primary colors and color correction coefficient A*ij are subjected to matrix operation at a matrix operation circuit 40.

On the other hand, respective color video signals R, G and B undergo a processing such that the d.c. levels are caused to match with each other at clamping circuits 5R, 5G and 5B. Thereafter, a gray component is extracted at a minimum level primary color signal selection circuit 60. Then, the gray component thus extracted is multiplied by respective correction coefficients K1, K2 and K3 obtained from the color correction coefficients A*ij at multiplying circuits 7R, 7G and 7B. Thus, correction signals of the gray component for the respective color signals are determined. Then, respective correction signals are added to color corrected signals at adding circuits or adders 8R, 8G and 8B. The signal thus obtained are outputted as gray balance corrected color signals R*, G* and B* from output terminals 9R, 9G and 9B.

In this embodiment, since conversion to complementary colors is not carried out, the gray component becomes equal to the minimum value among the color video signals R, G and B corresponding to respective colors. The principle of the second embodiment is the same as that of the first embodiment except for this point.

Namely, color corrective operation is applied to color signals without considering the gray balance of them and thereafter gray components obtained in harmony with that color corrective operation are added to color corrected signals for compensation. Where the gray component of the color video signal which has not yet undergone correction and the color correction coefficient are represented by GRAY and A*ij, respectively, color video signals R, G and B corresponding to respective primary colors finally obtained are expressed by the following equation (10):

$$\left. \begin{array}{l} R^* = A^*11(R - GRAY) + A^*12(G - GRAY) + A^*13(B - GRAY) + GRAY \\ G^* = A^*21(R - GRAY) + A^*22(G - GRAY) + A^*23(B - GRAY) + GRAY \\ B^* = A^*31(R - GRAY) + A^*32(G - GRAY) + A^*33(B - GRAY) + GRAY \end{array} \right\} \quad (10)$$

Arrangement of the above equation gives:

$$\left. \begin{array}{l} R^* = A^*11R + A^*12G + A^*13B + GRAY(1 - A^*11 - A^*12 - A^*13) \\ G^* = A^*21R + A^*22G + A^*23B + GRAY(1 - A^*21 - A^*22 - A^*23) \\ B^* = A^*31R + A^*32G + A^*33B + GRAY(1 - A^*31 - A^*32 - A^*33) \end{array} \right\} \quad (11)$$

The first to third terms of the right side of the above equation (11) correspond to a matrix operation, and the fourth term thereof indicates correction signals of the gray component. Accordingly, the correction coefficients K1, K2 and K3 are expressed by the following equation (12):

$$\left. \begin{array}{l} K1 = 1 - A^*11 - A^*12 - A^*13 \\ K2 = 1 - A^*21 - A^*22 - A^*23 \\ K3 = 1 - A^*31 - A^*32 - A^*33 \end{array} \right\} \quad (12)$$

As seen from the above-described two embodiments, the feature of this invention resides in that the color correction carried out in display or printing of a color image is such that the correction of the chromaticity of a reproduced color and the correction of deviation of the gray balance produced as the result of the former correction are carried out by separate systems. For this reason, color correction can be advantageously made to much degree without damaging the quality of am image displayed or a printed hard copy. Thus, the color corrector according to this invention is extremely advantageous to a printer for which a color correction is generally required to much degree.

I claim:

1. A color corrector provided in an apparatus for reproducing a color image from respective signals corresponding to predetermined primary colors of a plurality of primary colors constituting said color image, and adapted for correcting chromaticity of a color image reproduced, said color corrector at least comprising:

corrective operation means adapted to execute a predetermined operation between a color correction coefficient matrix and signals corresponding to said primary colors to thereby correct relative levels of signals corresponding to said primary colors;

gray component extraction means adapted to make a level comparison between signals corresponding to said primary colors to thereby extract a gray component;

correction signal output means adapted to execute an operation between the extracted gray component and correction coefficients corresponding to said respective primary colors determined by said color correction coefficient matrix to thereby output gray balance corrected signals for every said primary colors; and means for adding the level corrected signals corresponding to said respective primary colors outputted from said corrective operation means and outputs from said correction signal output means.

2. A color corrector as set force in claim 1, wherein said color corrector is provided in a color printer for reproducing a color image by the subtractive mixture of colors, said color corrector comprising:

a color masking circuit adapted to implement a signal processing based on a color masking matrix to three primary signals of a color image to carry out conversion to recording density signals of three colors complementary to said three primary color signals;

a maximum level primary color signal selection circuit for selecting a signal of which level is maximum from said three primary color signals;

a plurality of multiplying circuits correspondingly provided every rows of said color masking matrix of said color masking circuit, and for implementing a predetermined signal processing to each of output signals from said maximum level primary color signal selection circuit on the basis of color correction coefficients in a direction of respective rows of said color masking matrix; and adding circuits for adding outputs from said multiplying circuits correspondingly provided every said respective rows of said color masking matrix to recording density signals of said three primary complementary colors serving as outputs from said color masking circuit.

3. A color corrector as set force in claim 2, wherein said corrector for said color printer further comprises:

three input terminals provided in correspondence with respective colors of said three primary colors, three primary color video signals of said color image being applied to said three input terminals, respectively;

an inverse γ-correction/logarithmic conversion circuit for implementing inverse γ-correction and logarithmic conversion to three primary color video signals inputted through said input terminals; and three wide-band amplifying circuits every respective primary colors for amplifying respective output signals relating to three primary color video signals outputted from said conversion circuit to output them to the sides of said color masking circuit and said selection circuit.

4. A color corrector as set forth in claim 3, wherein said color corrector for said color printer further comprises;

three clamping circuits respectively provided every primary colors between said wide-band amplifying circuits for said primary color video signals and said maximum level primary color signal selection circuit, and serving to allow pedestal levels of output signals from said respective amplifying circuits to match with each other.

5. A color corrector as set force in claim 1, wherein said color corrector is provided in a Cathode Ray Tube (CRT) for reproducing a color image by the additive mixture of colors, said color corrector comprising:

a matrix operation circuit for implementing matrix operation based on color correction coefficients to three primary color signals of a color image to output three signals color-corrected every respective primary colors;

a minimum level primary color signal selection circuit for determining a minimum level of each of said three primary color signals to thereby extract a gray component included in said respective signals;

a multiplying circuit for multiplying the gray component extracted by said minimum level primary color selection circuit by correction coefficients determined on the basis of said color correction coefficients to determine and output correction signals of the gray component for said respective color signals; and an adding circuit for adding said correction signals of the gray components for said respective color signals outputted from said multiplying circuit to color-corrected signals outputted from said matrix operation circuit.

6. A color corrector as set force in claim 5, wherein said color corrector for said CRT display device comprises:

three input terminals provided in correspondence with respective colors of said three primary colors, three primary video signals of said color image being applied to said three input terminals, respectively; and three clamping circuits for allowing respective d.c. levels of three primary color video signals inputted from said three input terminals to match with each other to output them to said minimum level primary color signal selection circuit.

* * * * *